(12) United States Patent
Zaner et al.

(10) Patent No.: US 7,373,609 B2
(45) Date of Patent: May 13, 2008

(54) VIRTUAL CALLING CARD SYSTEM AND METHOD

(75) Inventors: Melora Zaner, Seattle, WA (US); Cesare John Saretto, Seattle, WA (US); Eugene Zarahovsky, Seattle, WA (US); Eugene Mesgar, Seattle, WA (US); Neel Ishwar Murarka, Seattle, WA (US); Eun-Kyung Chung, Redmond, WA (US); Kathleen Mulcahy, Seattle, WA (US); Rama Ranganath, Seattle, WA (US); Erica Sanders, Seattle, WA (US); Tammy Savage, Seattle, WA (US); Linda Stone, Seattle, WA (US); John Vert, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 11/279,357

(22) Filed: Apr. 11, 2006

(65) Prior Publication Data

US 2006/0168544 A1    Jul. 27, 2006

Related U.S. Application Data

(62) Division of application No. 10/229,509, filed on Aug. 28, 2002, now Pat. No. 7,149,977.

(51) Int. Cl.
*G06F 3/00* (2006.01)
(52) U.S. Cl. ................. 715/753; 715/751; 715/752
(58) Field of Classification Search .......... 715/751, 715/752, 753, 758; 709/204
See application file for complete search history.

(56) References Cited

U.S. PATENT DOCUMENTS

| 5,303,388 A | 4/1994 | Kreitman et al. |
| 5,351,995 A | 10/1994 | Booker |
| 5,734,154 A | 3/1998 | Jachimowicz et al. |

(Continued)

OTHER PUBLICATIONS

Smith, Marc A., et al. "The Social Life of Small Graphical Chat Spaces," In Proceedings of CHI 2000, The Hague, Netherlands, http://research.microsoft.com/scg/papers/vchatchi2000.pdf (Mar. 2000) pp. 1-8.

(Continued)

*Primary Examiner*—Kieu D. Vu
(74) *Attorney, Agent, or Firm*—Amin, Turocy & Calvin, LLP

(57) ABSTRACT

A novel virtual calling card system and method aid in the formation of online relationships, serving as an introduction tool and as a contact mechanism. The calling card is an exchangeable entity that is automatically updated, ensuring that the recipient or viewer sees the most current version of the card. The card may display an aspect ratio that is the same as that of a traditional business card, and has a front side and a reverse side. Furthermore, the card provides a number of avenues for the card owner to express themselves, including an array of affiliation symbols, a most recent mood symbol, and a text field. The reverse side of the card can display a representation of the owner's social network, so that the recipients of the card may identify common friends and associates. Thus, the sewer-based card exchange appears to users as an exchange in the physical world.

20 Claims, 8 Drawing Sheets

U.S. PATENT DOCUMENTS

| | | | |
|---|---|---|---|
| 5,796,395 | A | 8/1998 | de Hond |
| 6,115,724 | A | 9/2000 | Booker |
| 6,476,830 | B1 | 11/2002 | Farmer et al. |
| 6,791,583 | B2 | 9/2004 | Tang et al. |
| 6,879,994 | B1 | 4/2005 | Matsliach et al. |
| 6,883,000 | B1* | 4/2005 | Gropper ............... 707/10 |
| 6,981,223 | B2 | 12/2005 | Becker et al. |
| 7,035,926 | B1* | 4/2006 | Cohen et al. ............ 709/225 |
| 7,225,246 | B2* | 5/2007 | Shapira ............... 709/223 |
| 2002/0156917 | A1* | 10/2002 | Nye ............... 709/238 |
| 2002/0157104 | A1* | 10/2002 | Nakada et al. ............ 725/97 |
| 2003/0050976 | A1 | 3/2003 | Block et al. |
| 2003/0093508 | A1 | 5/2003 | Li et al. |
| 2003/0110077 | A1* | 6/2003 | Fujino ............... 705/14 |
| 2003/0216930 | A1* | 11/2003 | Dunham et al. ............ 705/1 |

OTHER PUBLICATIONS

Cheng, Lili, et al., "Hutchworld: Lessons Learned. A Collaborarive Project: Fred Hutchinson Cancer Research Center & Microsoft Research," In Proceedings of Virtual Worlds Conference 2000, Paris, France, http://research.microsoft.com/scg/papers/hutchvw2000.pdf, (Jun. 2000) pp. 1-12.

Kollock, Peter., "The Economies of Online Cooperation: Gifts and Public Goods in Cyberspace," Communities in Cyberspace, 1998 http://sscnet.ucla.edu/soc/faculty/kollock/papers/economies.htm, pp. 1-17.

Kollock, Peter, et al., "Managing The Virtual Commons: Cooperation and Conflict in Computer Communities," University of California, Los Angeles, http://research.microsoft.com/scg/papers/KollockCommons.htm (1996) pp. 1-20.

Smith, Marc A., et al., "What Do People Do in Virtual Worlds? An Analysis of V-Chat Log File Data," University of California, Los Angeles, http://research.microsift.com/scg/papers/kollockv-chat.pdf (1998) pp. 1-30.

Farnham, Shelly, et al., "Supporting Sociability In A Shared Browser," In Proceedings of Interact Conference, Tokyo, Japan, http://research.microsoft.com/scg/papers/sharedbrowsinginteract.pdf (Jul. 2001) pp. 1-8.

* cited by examiner

VIRTUAL CALLING CARD SYSTEM AND METHOD

CROSS-REFERENCE TO RELATED APPLICATIONS

This application is a divisional application of Ser. No. 10/229,509 filed Aug. 28, 2002 now U.S. Pat. No. 7,149,977, VIRTUAL CALLING CARD SYSTEM AND METHOD which is incorporated herein by reference.

TECHNICAL FIELD

This invention relates generally to network communication and interaction over a network connection and, more particularly, relates to a virtual calling card system and method that facilitate the presentation of owner information and provide a point of contact for online communications with the owner.

BACKGROUND OF THE INVENTION

In a brief span of time, digital networking between distant parties, such as over the Internet, has gone from extraordinary to commonplace. Initially, many networking interactions focused on data transfer and other nonsocial activities, but social networking has increasingly become an important motivation for online activities. This is especially true for younger users, for whom the Internet has existed since childhood.

However, social relationships over a digital connection are still not as easily made or maintained as similar relationships in the physical world. One primary difficulty pertains to a user's ability to reach out initially to other individuals and to begin a relationship or interaction. A number of techniques and technologies have arisen in attempts to address this issue, however none have been completely successful, and thus an unmet need still exists. The primary technologies aimed at solving this dilemma are customized web pages, online profiles, and vcards (virtual business cards). Each of these techniques exhibits shortcomings that prevent it from satisfying the needs discussed above.

For example, a customized web page could allow a user to describe herself in a free form manner. However, web pages require more than minimal expertise to establish, thus limiting the pool of potential users. In addition, a web page does not itself appear to the user as an exchangeable entity. Similarly, the online profile exhibits a number of drawbacks. For example, as with a web page, an online profile is typically not a directly exchangeable entity. Rather, a recipient must retrieve a locator, and then manually act again to retrieve the information identified by the locator. In addition, online profiles are typically constrained in content by rules established by the profile service provider. Finally, vcards, while providing some benefits, also do not provide a complete solution to the problems described above. A vcard is typically a self-contained collection of data that appears visually in the format of a business card. While the vcard is exchangeable between users, it has a number of other shortcomings. For example, since it is entirely self-contained, it may contain stale information that is in need of updating. In addition, the format of user information for a vcard is significantly constrained, and the vcard lacks other attributes of a physical card, such as having two sides rather than just a single side.

There remains a need for an online contact mechanism that can be passed, automatically updated, and which can serve as a contact point for initiating further online communication. Such a mechanism can ease the manner in which online introductions are made and relationships begun, and can also provide a user with greater latitude than was previously available for more fully describing themselves, their interests, and their associations.

SUMMARY OF THE INVENTION

The present invention is directed to a virtual calling card that aids in the formation and sustenance of online relationships. The calling card is an exchangeable entity that is not wholly self-contained. The calling card is automatically updated whenever it is passed or opened, thus ensuring that the recipient or viewer sees the most current version of the card. Although the calling card provides many benefits beyond those provided by a traditional business card, the calling card nonetheless has many of the aspects of a physical card. In an embodiment of the invention, the card displays an aspect ratio that is the same as that of a traditional business card. Moreover, the calling card has a front side and a reverse side, which may be toggled via a flip control located at the corner of the card. Furthermore, the card provides a number of mechanisms for card owners to express themselves, including an array of affiliation symbols, a most recent mood symbol, and a text field for containing text of the owner's choosing. The reverse side of the card, accessed via the flip control, can display a representation of the owner's social network, so that recipients of the card may identify friends that the owner and recipient have in common. Alternatively or additionally, a diagram of the path that the card has traveled may be displayed, with nodes on the path being identified with the individual who received the card at that point.

The exchange of the card beneficially appears to the users to simply be a transfer of the card from the owner, or other party, to the recipient, much as a card changes hands in the physical world. However, the information corresponding to the card is stored on a central server, as well as in local cache at the recipient or viewer machine if the recipient or viewer has previously accessed the card in question. The recipient or viewer obtains, via any of a number of processes, a locator usable to identify and retrieve the calling card in question. The calling card information is then located via the locator at the server or in cache, and is displayed.

In an embodiment of the invention, the card provides a point of contact from the recipient to the owner. Initial contact based on the calling card will be routed from the recipient to the owner via the central server, but future correspondence can occur more directly, such as via a peer-to-peer connection if the owner wishes to begin a relationship with the recipient.

Additional features and advantages of the invention will be made apparent from the following detailed description of illustrative embodiments that proceeds with reference to the accompanying figures.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION OF THE INVENTION

Figure 1:
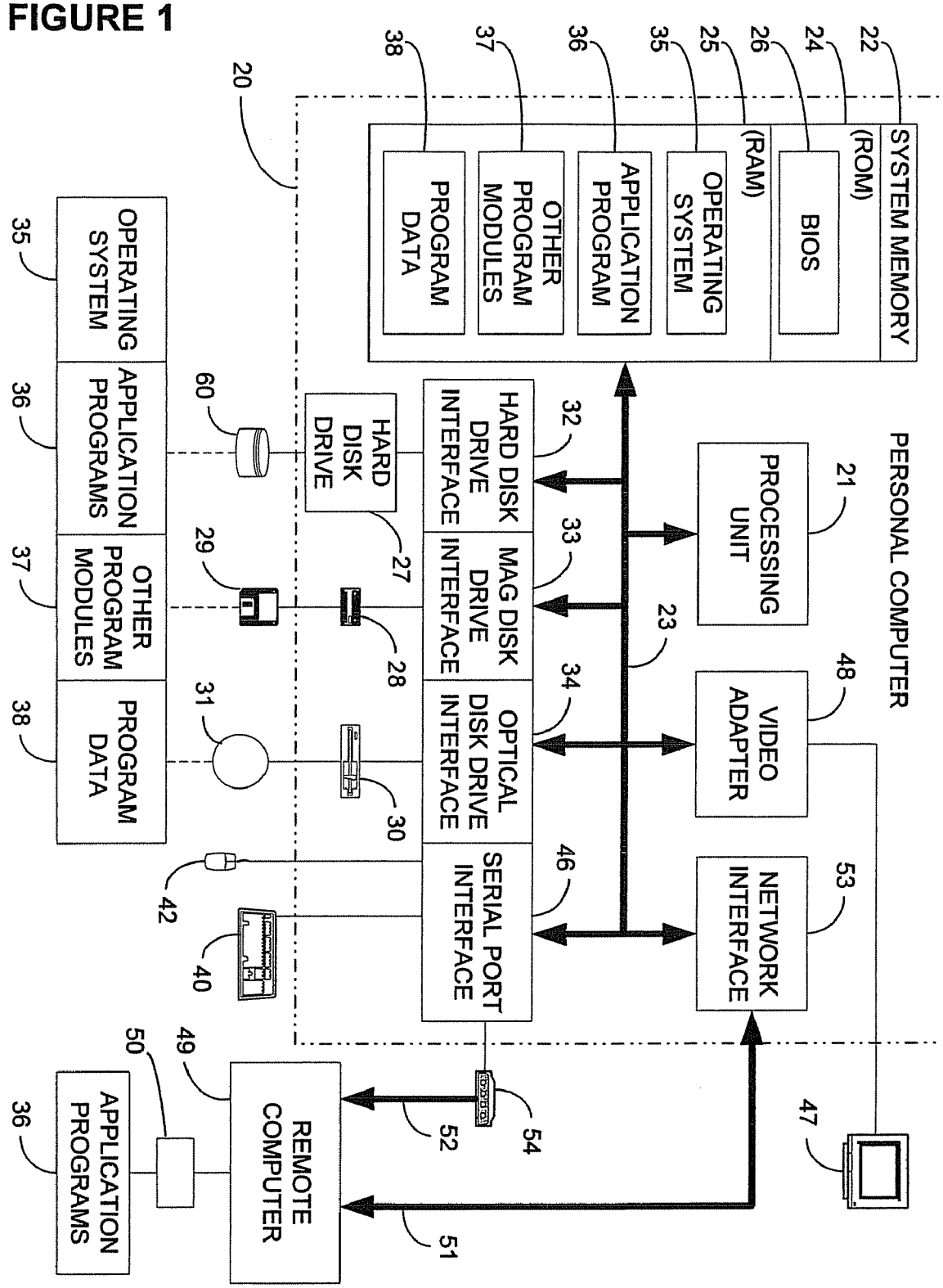
FIG. 1 is a schematic diagram generally illustrating an exemplary computer system usable to implement an embodiment of the invention.

Turning to the drawings, wherein like reference numerals refer to like elements, the invention is described hereinafter in the context of a computing environment. Although it is not required for practicing the invention, the invention is described as it is implemented by computer-executable instructions, such as program modules, that are executed by a computing device. Generally, program modules include routines, programs, objects, components, data structures and the like that perform particular tasks or implement particular abstract data types.

The invention may be implemented in many different computing device configurations. For example, the invention may be realized in hand-held devices, mobile phones, multi-processor systems, microprocessor-based or programmable consumer electronics, network PCs, minicomputers, mainframe computers and the like, wearable computing or communication devices, and any other device capable of both visual display and direct or indirect communication with another device. The invention may also be practiced in distributed computing environments, where tasks are performed by remote processing devices that are linked through a communications network. In a distributed computing environment, program modules may be located in both local and remote memory storage devices. Thus it will be understood that the invention is preferably incorporated into many types of computing environments as suggested above.

Before describing the invention in greater detail, an example computing environment in which the invention may operate is described in connection with FIG. 1. The computing device 20 includes a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that help to transfer information between elements within the computing device 20, such as during start-up, is stored in ROM 24. The computing device 20 may further include a hard disk drive 27 for reading from and writing to a hard disk 60, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer readable instructions, data structures, program modules and other data for the PC 20. Although the exemplary environment described herein employs a hard disk 60, a removable magnetic disk 29, and a removable optical disk 31, it will be appreciated by those skilled in the art that other types of computer readable media which can store data that is accessible by a computing device, such as magnetic cassettes, flash memory cards, digital video disks, Bernoulli cartridges, random access memories, read only memories, and the like may also be used in the exemplary operating environment.

A number of program modules may be stored on the hard disk 60, magnetic disk 29, optical disk 31, ROM 24 or RAM 25, including an operating system 35, one or more applications programs 36, other program modules 37, and program data 38. A user may enter commands and information into the device 20 through input devices such as a keyboard 40 and a pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB). A monitor 47 or other type of display device is also connected to the system bus 23 via an interface, such as a video adapter 48. In addition to the monitor, the computing device typically includes other peripheral output devices, not shown, such as speakers and printers.

The device 20 is operable in a networked environment using fixed or transient logical connections to one or more remote computing devices, such as a remote computer 49. The remote computer 49 may be another similar computing device, a server, a router, a network PC, a peer device or other common network node, or any other device type such as any of those mentioned elsewhere herein, and typically includes many or all of the elements described above relative to the computing device 20, although there is no such requirement, and only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the computing device 20 is connected to the local network 51 through a network interface or adapter 53. When used in a WAN networking environment, the computing device 20 typically includes a modem 54 or other means for establishing communications over the WAN 52. The modem 54, which may be internal or external, is connected to the system bus 23 via the serial port interface 46. Program modules depicted relative to the computing device 20, or portions thereof, may be stored in the remote memory storage device. It will be appreciated that the network connections shown are exemplary and other means of establishing a communications link between the computers may be used. Additionally, the invention is not intended to be limited to a particular network type. Any network type, wired or wireless, fixed or transient, circuit-switched, packet-switched or other network architectures, may be used to implement the present invention.

In the description that follows, the invention will be described with reference to acts and symbolic representations of operations that are performed by one or more computing devices, unless indicated otherwise. As such, it will be understood that such acts and operations, which are at times referred to as being computer-executed, include the manipulation by the processing unit of the computing device of electrical signals representing data in a structured form. This manipulation transforms the data or maintains it at locations in the memory system of the computing device, which reconfigures or otherwise alters the operation of the computing device in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operations described hereinafter may also be implemented in hardware.

Figure 2:
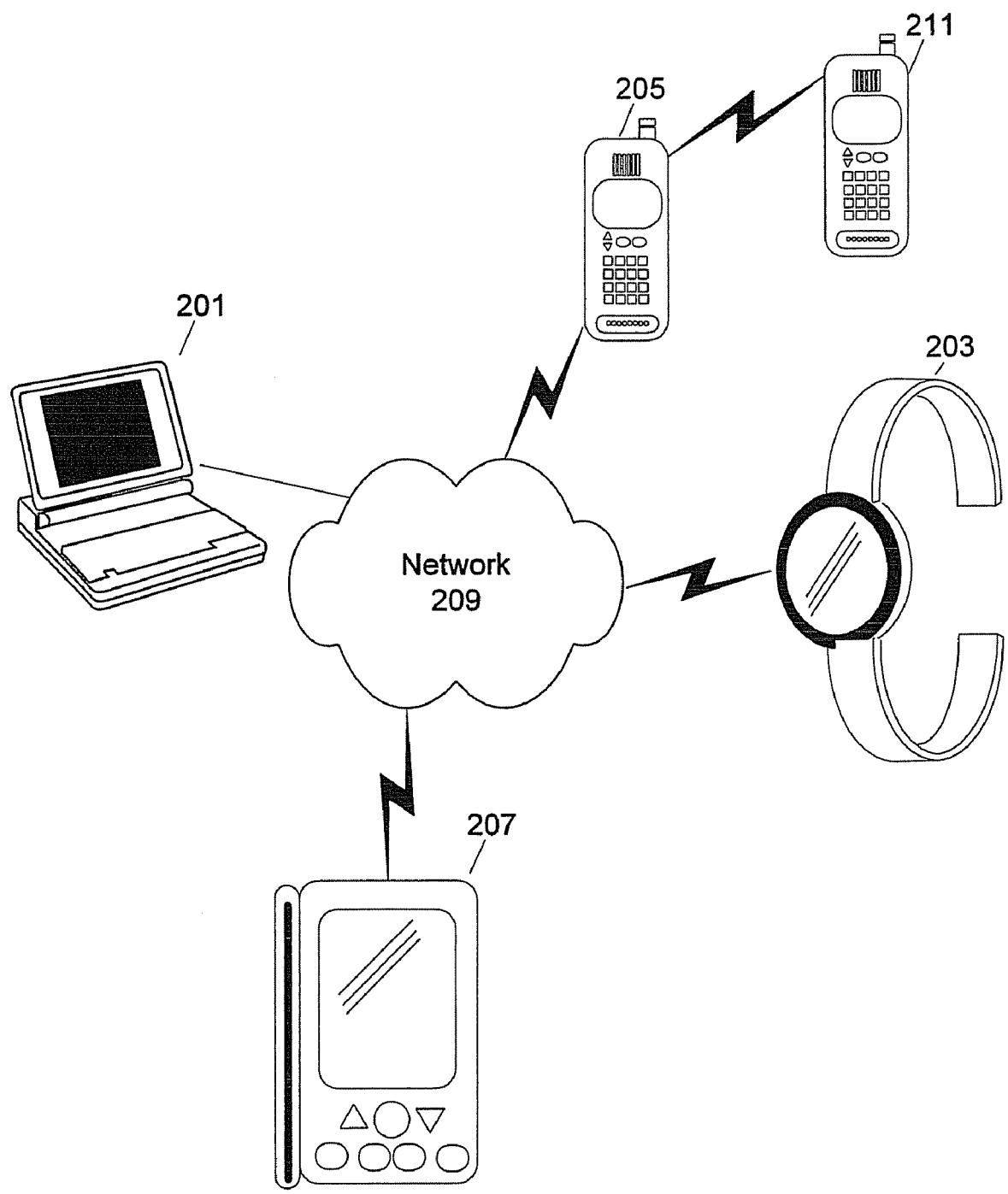
FIG. 2 is a schematic diagram illustrating an exemplary network environment for communications in an embodiment of the invention.

FIG. 2 is a schematic diagram of a network environment within which an embodiment of the invention may be implemented. In particular, a plurality of user devices 201, 203, 205, and 207 are illustrated as being communicably linked via a network 209. Each user device will typically be used by or associated with a different user. The exact number of user devices so linked is not important for the present invention, although a network communication will typically involve at least two users. Furthermore, the type of network 209 is not critical, and may be peer-to-peer, server-based, a hybrid of the two, or any other type of link or network that allows an exchange of information, directly or indirectly between two user machines. For example, one contemplated network type is a simple beam communication between devices such as devices 205 and 211. The beam may be electromagnetic (e.g. visible radiation, IR radiation, UV radiation, RF radiation, etc.) acoustic (e.g. audible or otherwise), or any other directional or non-directional beam or emanation capable of carrying information. Via the network 209, a communication from one user may be transmitted to another user or users (via their respective user devices).

One or more user machines 201 used to implement an embodiment of the invention may be as illustrated with respect to the computing device architecture of FIG. 1, although there is no such limitation inherent in the invention. It is contemplated that an implementation of the invention will additionally or alternatively be used with any of a number of other communication device types, presently known and otherwise, including but not limited to wearable communication devices (203), cell phones (205), and PDAs (207).

Figure 3A:
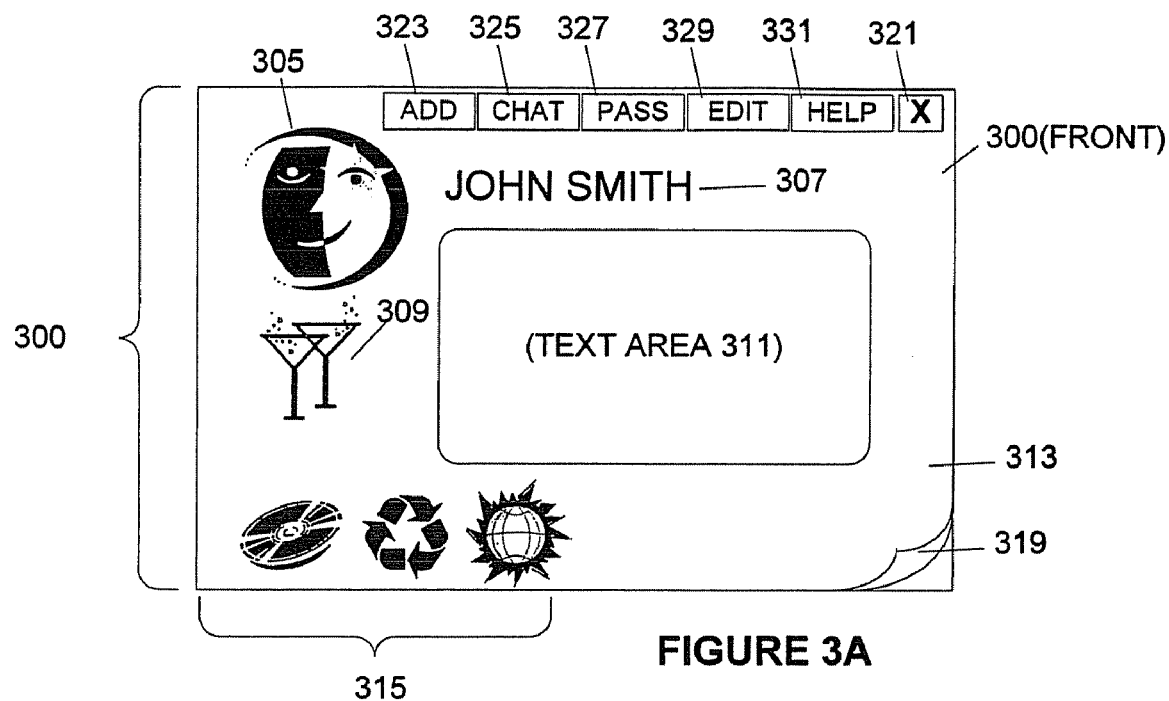
FIG. 3A is an illustration of the front side of a calling card according to an embodiment of the invention.
Figure 3B:
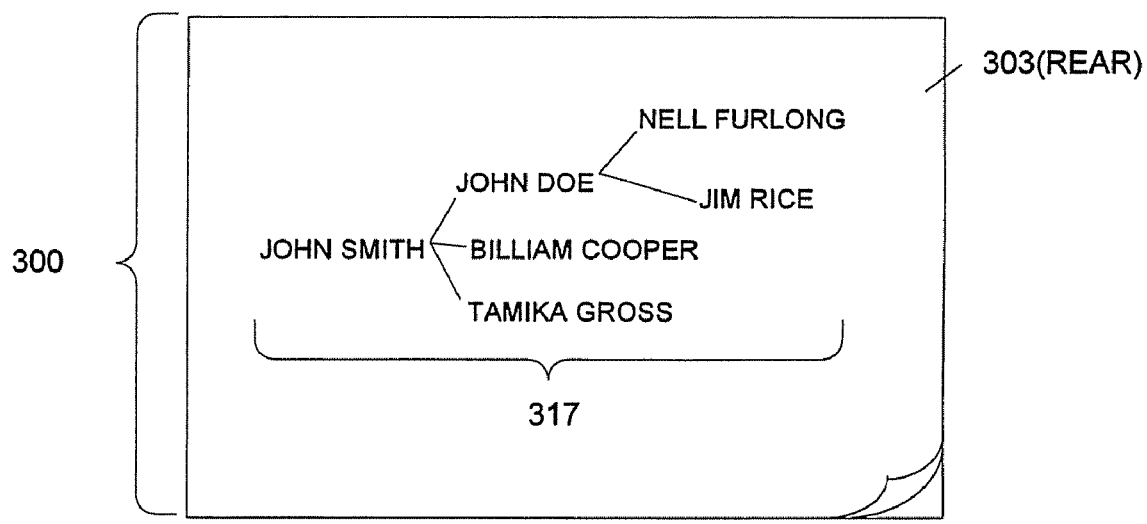
FIG. 3B is an illustration of the reverse side of a calling card according to an embodiment of the invention.

The calling card itself will be described in greater detail, after which usage scenarios and exemplary implementation details will be discussed. In overview, a calling card according to an embodiment of the invention is passable between users over the network 209, so that users who are not previously directly acquainted may become familiar with each other. FIG. 3 illustrates one exemplary configuration of the calling card 300, with FIG. 3A showing the front side 301 of the card and FIG. 3B showing the rear side 303. The card is an exchangeable article that is only partially self-contained so that the card may update itself, as will be described in greater detail below. Also to be discussed hereinafter, the card does not simply provide contact information (it does not necessarily provide contact information in human-readable form at all), but rather serves as a point of contact from the card user to the card owner.

The calling card 300 preferably exhibits the same aspect ratio as a standard physical business card, although such is not required. Although the calling card 300 may be rendered at different scales, the card 300 is generally preferably shown at about the same size as a business card, such as at 175×100 pixels. The calling card 300 comprises a number of components in an embodiment of the invention, such as an owner's character 305 (24×24 pixels)(as selected or generated by the owner), owner's name 307 (as input by the owner), an indication of the owner's most recent mood 309 (as input or selected by the owner), a text area 311 for containing text entered by the owner, a background image or pattern 313 as created or selected by the owner, and affiliation symbols 315, also selected by the owner.

In an embodiment of the invention, affiliation symbols other than those also displayed by a card of the recipient are suppressed. Thus, the recipient would know what affiliations she and the card owner had in common, but would not be aware of the owner's other affiliations. Using this functionality, a card owner will feel less inhibited in their choice of affiliations, knowing that those affiliations will be made known only to others that share the particular interest or association in question.

In addition to the above-described informative items, a number of active controls may be also provided on the calling card 300 as well. For example, a "close" control 321 placed in the upper right hand corner of the front face 301 of the card 300 may be used to close the calling card 300, so that it is no longer open and no longer rendered on the display. An "Add" control 323 situated on the front 301 of the card 300 is usable to add the card owner to a list of contacts, such as for a group interaction application. A "Chat" button 325 allows the recipient to contact the owner and open an online conversation. Such contact may be made via a central server as discussed below. The recipient may elect to pass the card to another party via a "Pass" control 327, although cards may be passed through other mechanisms, such as for example drag and drop, as well. When the owner displays his or her own calling card, an "Edit" control 329 is preferably displayed so that the owner can change the appearance and content of their card. As discussed below, any changes will be reflected in a most recent version of the calling card stored on a central server so that each time any party opens the card 300 they have access to the latest version thereof. In the bottom right hand corner of the front side 301 of the card 300, a flip control 319 is displayed. By selecting the flip control 319, the user can flip the card to view the reverse side 303 as shown in FIG. 3B. On the reverse side 303 of the card 300, the primary feature is a depiction 317 of the owner's social network. Finally, a "Help" item 331 allows a user to access information about what the calling card is and how to use it.

It can be seen that the card 300 provides its owner with a number of avenues through which to express his or her interests and affiliations. Upon opening their calling the card, the user can change their character 305 appearance, their background image or pattern 313, and the font size and color for the text on the card 300. In addition, the user can add or edit text within the text area 311. The text within the text area 311 may be any text desired by the owner, such as a phone number and/or address as with a traditional business card, or a quote, recipe, short poem, etc. The text preferably wraps, such as by word, within the text area 311, and also preferably becomes scrollable should the amount of text exceed the size of the text area 311. Preferably the text area 311 allows for rich text formatting, such as through a subset of HTML tags (e.g. font, link, center, paragraph, horizontal rule, numbered list, bulleted list, right justified, and heading). In the illustrated embodiment, the text area 311 is not formatted to optimally accommodate images or other media, although such may be accommodated if desired in an embodiment of the invention.

The owner can also add or remove affiliation symbols 315. Such symbols can be generated by the user, either by importing the image from another source or through the use of a drawing application, or can be prepackaged and provided by the distributor of the calling card application. The symbols should be such as to respect any proprietary rights, such as copyrights or trademark rights, that third parties may have. For symbol providers, a sufficient number and variety of symbols should be provided so as to enable a wide range of expression via selection. Appropriate symbol categories include without limitation: Greek letters, foods (bananas, apples, etc.), household items (phones, couches, etc.), cars, elements (earth, air, fire, water), tools (hammers, scythe, etc.), plants (flowers, trees, etc.), astronomy, folklore (e.g. alchemy, astrology), mathematics, medicine, music, recreation, religion, and safety.

With respect to the reverse side 303 of the card 300, the owner can also change the appearance of their social network. For example, the owner may opt not to display their network at all, or may opt to display information related to only those friends that the card owner and card recipient have in common. Thus, the card would appear differently depending upon the identity of the recipient. The information regarding the social network is gleaned at both the owner's machine and the recipient's machine from a respective list of contacts on each, such as for an online group experience application, or from another computer accessible listing of contacts or friends.

With respect to implementation, the calling card is preferably an XML entity, or "blob." The XML blob is stored on a central store connected preferably to the Internet, directly or indirectly, or to another network over which both the card owner and recipient can communicate at some point in time, although not necessarily at the same time. The contact information for the owner is a Passport address in an embodiment of the invention, but such is not required. Any other suitable contact information or format usable to connect the user to the card owner directly or indirectly may also be used without departing from the scope of the invention. The calling card can be accessed on the central store using a locator derived from the contact information via a one-way hash. Thus the owner's contact information preferably cannot be derived from the locator, although a party already having the owner's contact information could hash that information to create a locator to retrieve the owner's calling card. As will be described in greater detail hereinafter, the passing of a calling card from an owner or other person to a recipient comprises the passing of the locator, which is then automatically used to retrieve the calling card itself.

The calling card owner can update the calling card by updating the appropriate calling card file at the central server. The calling card locator and the XML blob are cached at the owner's machine (and at each recipient's machine). Thus, every time the calling card is rendered, the central server is checked to determine whether the calling card has been updated since the cache was populated, and if so, the latest version of the calling card is downloaded. Similarly, when the card is "passed," the version retrieved via the locator is the most recent version. Because a particular calling card may be retrieved by a number of recipients, the updating of the calling card is preferably not signified via a simple flag. However, multiple flags associated with multiple recipients may be used, or, more preferably, the recipient cache date and the server most recent version date can be compared to determine whether an update has occurred for the calling card in question.

Note that the calling card may be passed to others by the owner, but may also be again passed from prior recipients to others. Although this secondary distribution may raise a concern of the unauthorized sharing of the owner's contact information, in an embodiment of the invention the owner's contact information (e.g. passport address etc.) is not contained within the XML blob, as mentioned above. At the same time, this does not prevent contact between the particular recipient and the owner if both are amenable to such. In an embodiment of the invention, the recipient may contact the owner via the central store, which will then relay the message to the owner without revealing the owner's contact information. In an implementation of the invention, the "chat" button 325 or other button or control on the calling card is actuated by the viewer to initiate contact.

In an embodiment of the invention, the calling card fulfills a "match making" function by causing a notification to be issued to a card recipient when the affiliation or interest symbols of the card match, to some predefined degree, the affiliation or interest symbols of a card of the recipient. In a mobile scenario, to be discussed further below, calling cards are accessed via mobile devices, such as cell phones, etc. In such an environment, if two location conscious devices are in close proximity and the calling cards of the device owners share a predetermined number of affiliation symbols, then the users are apprised of the fact that a possible "match" is nearby. At that point, the users may wish to engage in an anonymous messaging conversation to determine whether to find each other or not.

The calling card described herein improves the dynamics of online relationship building via its tradability and the aspect of transitive trust that it facilitates. Several usage scenarios will be discussed to highlight these features of the card. One scenario in which the card may be used is the third party introduction, i.e. the introduction of two individuals who, although unknown to each other, are both known to a third party. For example, assume that Kate and Sarah are friends, and that Sarah and Rob are friends, but that Kate and Rob are not known to each other. Sarah wants to introduce Rob to Kate. Sarah can accomplish this with the calling card by passing Rob's card to Kate. Once Kate has Rob's card, she can view the material thereon, and can flip the card over, such as by mouse clicking at the edge of the card, to view the rear side, which displays Rob's social network in an embodiment of the invention. From viewing the card, she can make a determination as to whether or not she wants to contact Rob. If she desires to contact Rob, the calling card serves as a contact point to do so, as discussed above.

The calling card is also usable for direct introduction. For example, assume that Kate and Charles meet at school. Afterwards, Charles would like to talk more with Kate, perhaps online. Remembering only Kate's name, Charles searches online for Kate's email address, and the search reveals Kate's calling card. In looking at the card, Charles notes that one of the affiliation symbols indicates that Kate is affiliated with a popular environmental organization. Charles too is interested in helping to preserve and maintain the environment, and decides to contact Kate, via the mechanism discussed above, to talk about their common interests.

There are a number of mechanisms by which the calling card can be passed and displayed which will be discussed herein, although those of skill in the art will appreciate from the teachings herein that there exist other ways in which to pass and display the card. If the card passer and recipient are using a group interaction application or other application that is able to access and possibly manipulate the calling card, the passer may access a "stored" calling card through the application, and subsequently view or pass the card, as well as receive and view new cards. Note that if the card has been updated after it was cached, then the latest version of the card is obtained from the central server for rendering. As an alternative to using a group interaction application, the XML blob of the calling card may simply be exchanged much like any other file, such as via instant messaging or email. In either case, the latest calling card information is retrieved automatically from the central store (or cache) based on the locator without further user interaction, so that it appears to the recipient that the card itself was simply passed.

Although the invention entails no inherent limitation as to when and to whom the cards may be passed, the observation of a few simple rules may help in the use of the cards. It is preferred that a card not be passable to its owner, since that would generally serve no purpose, although a person may receive a card that they already have or at some point had. The latter provision is preferable since the card is not simply a body of information, but is also in some sense an invitation to initiate contact with the owner. Thus, whether or not a party already has access to the relevant information, there is a role to be served by the card as a prominent message that the owner (or a third party passing the owner's card) would like the recipient to contact them.

Similarly, there are a number situations and manners in which the calling card can be displayed to a user. If the interested party has on their machine a group interaction application as discussed above, the individual can open up another party's calling card by clicking an icon within the group interaction application, wherein the icon is associated with that other party. The display produced in this manner is preferably a full scale rendering of the calling card.

Alternatively, a sender may pass a card to a recipient during an online conversation or to initiate the online conversation. In particular, when the card is passed in this manner, an online conversation is initiated, if not already extent, via the opening of a suitable window or space on the recipient's machine. Subsequently, a dialog line may be automatically placed into the conversation indicating the passing of the card. For example, the added line might state "John passed Sally's Card to Henry."

The added line also displays a thumbnail, or reduced image, of the passed calling card in an embodiment of the invention. The thumbnail size is substantially less than that of the full-scale card, such as 53×30 pixels. However, the thumbnail image is preferably not a thumbnail in the traditional sense, i.e. a directly scaled version, but is preferably rather a selectively scaled version so that the text remains readable and the character image and other items such as affiliation symbols remain at least somewhat discernable. Clicking on the thumbnail of the calling card preferably causes a full-scale image of the calling card to be displayed.

Note that when a user adds another user to their contact list using the "Add" button 323 of the calling card 300, a full scale image of the adding party's calling card is preferably displayed to the added party within a dialog box, from which the added party may accept or refuse to be added as a contact of the adding party. Because the calling card of the adding user appears in this case within another window, its close control 321 is preferably suppressed. Similarly, the dialog box preferably presents an option to the added party to add the adding party to their contact list. In such a case, the "Add" control 323 of the card need not be enabled.

As discussed briefly above, the calling card is also useful in a mobile scenario wherein a recipient and/or sender are online via a mobile device such as a cell phone, PDA, etc. There are optimizations that may be made and qualities that may be taken advantage of in the mobile scenario. For example, the user interface of mobile devices is often limited in size and resolution, and therefore, it is preferable that the format of the card be adjusted so as to be easily visible on such a display. In order to make reading of the card easier in such a situation, it may be desirable to list at the top of the display the identity of the card owner and their phone number in an embodiment of the invention.

Additionally, calling cards may serve as a better source of contact information than a phone book of a mobile device, since the calling card is always current, although such will not be possible in embodiments of the invention wherein the calling card does not contain direct contact information. A further use in the mobile scenario for a calling card that does contain phone number information is to link the card to the ring functionality of a mobile phone. For example, an audio clip attached to the card can be played when an incoming call originates from that card's owner, rather than playing the standard ringer. The clip is preferably updateable in the same manner as the remainder of the card.

Figure 6:
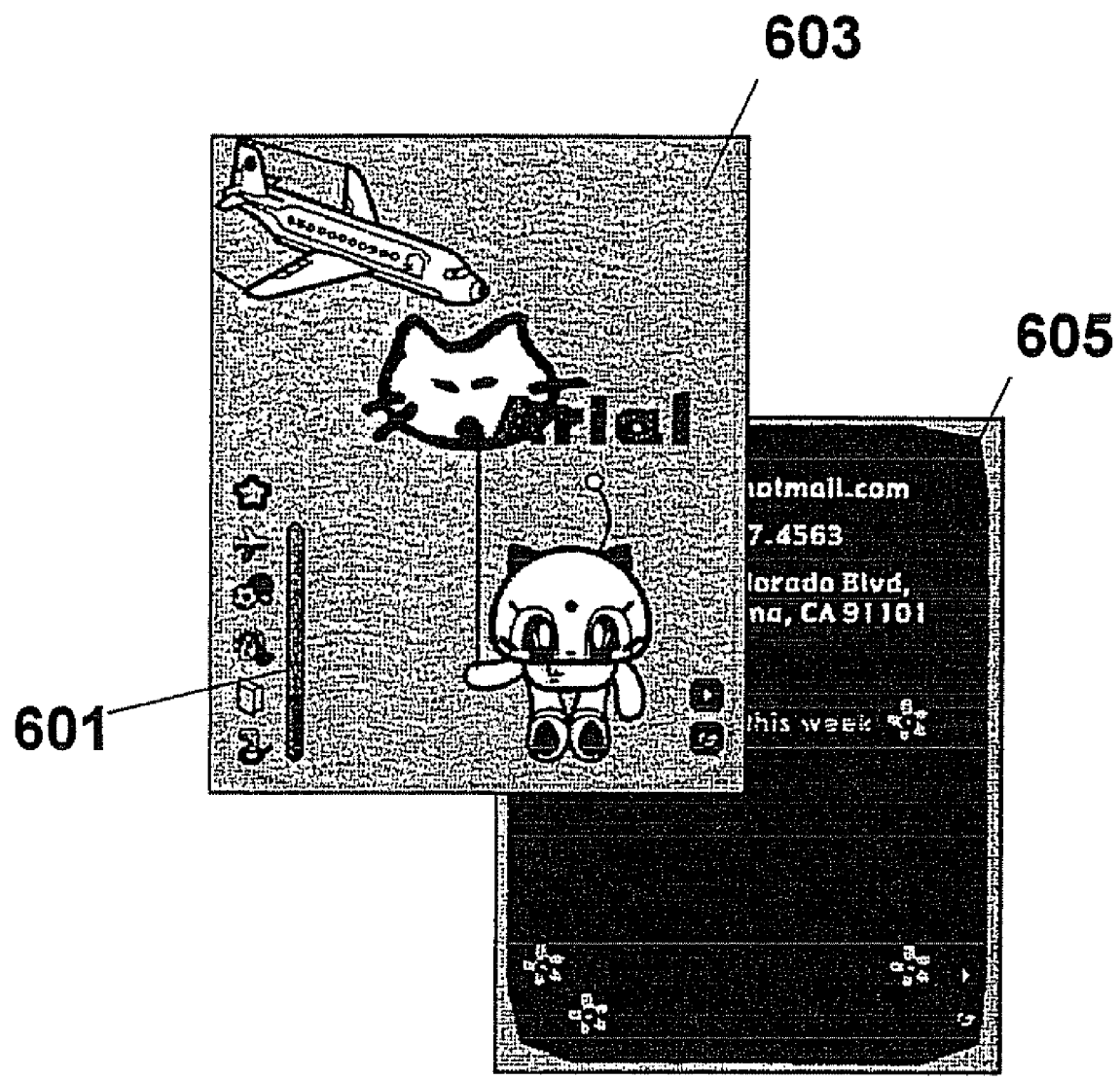
FIG. 6 is an illustration of the front and back sides of a calling card according to an alternative embodiment of the invention.

FIG. 6 shows an alternative calling card configuration according to an embodiment of the invention. The front 603 and the back 605 of the two-sided card are shown. In addition to the alternative card orientation, as distinct from that of a business card, the alternative configuration also illustrates another feature according to another embodiment of the invention. In particular, a bar graph 601 or other indicator displays an indication of the card owner's social power. The social power of a card owner is determined by the number of other users who possess the owner's card, with a greater number of possessors yielding a greater social power. Possession of a card may be determined by any suitable definition, but in an embodiment of the invention, a card is possessed if it is in a user's card library, which will be discussed below. The social power indicator is relative, and thus the same number of cards possessed will yield different degrees of social power depending upon the number of other users' cards that are possessed by others. The pool of users competing for social power may be defined in any suitable manner, however in an embodiment of the invention the pool of users is comprised of all users of such calling cards. The degree of social power possessed by a particular user can be used to convey benefits beyond simple popularity, such as special animations, shapes, stickers, audio clips etc. usable by the user to augment their calling card.

Figure 7A:
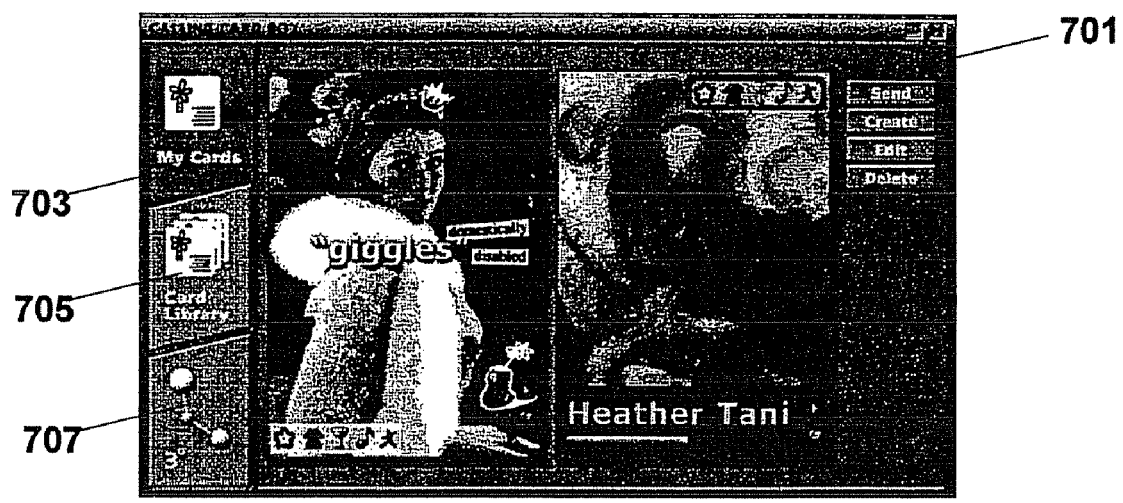
FIG. 7A is an illustration of a user interface for accessing calling cards received by a recipient as well as the recipient's own calling cards in an embodiment of the invention.
Figure 7B:
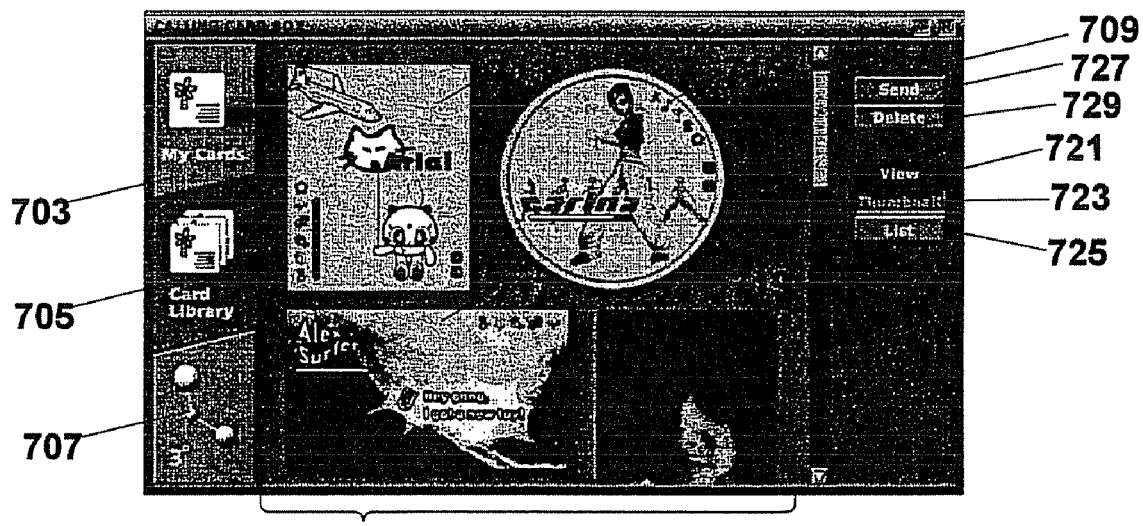
FIG. 7B is a further illustration of a user interface for accessing calling cards received by a recipient as well as the recipient's own calling cards in an embodiment of the invention.
Figure 7C:
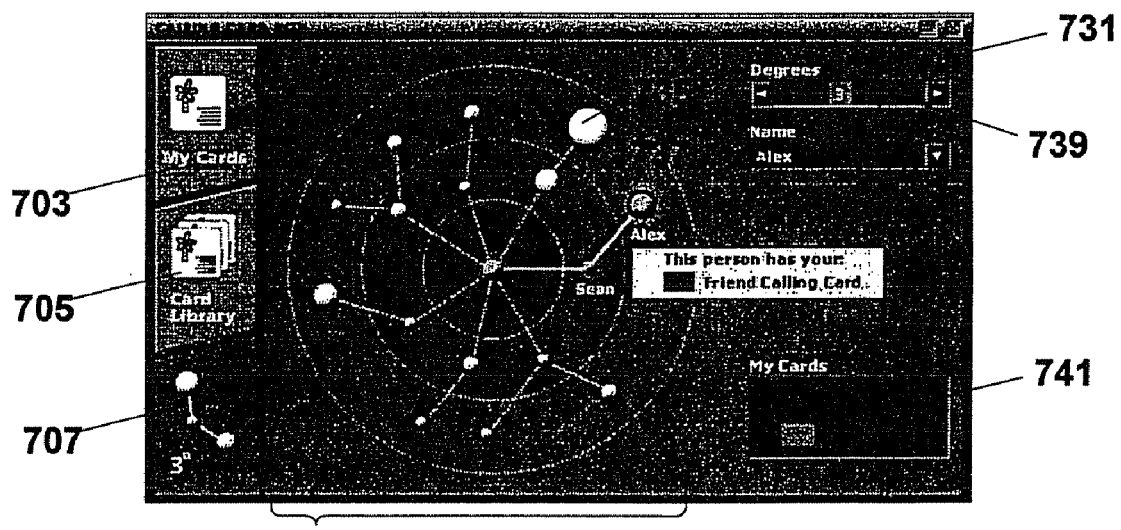
FIG. 7C is yet a further illustration of a user interface for accessing calling cards received by a recipient as well as the recipient's own calling cards in an embodiment of the invention.

FIGS. 7A-7C illustrate a calling card "box" for storing received calling cards and for performing other calling card access and information functions as described hereinafter. FIG. 7A illustrates an exemplary user interface 701 for accessing calling cards and calling card information. A feature of the illustrated embodiment is an ability to access both one's own calling cards as well as the cards of others. Three selectable controls 703, 705, 707 expose respectively the owner's cards ("my cards"), the cards that the owner has received ("card library"), and the social network of the user ("3°").

The interface of FIG. 7A illustrates the owner's card ("my cards") either as a default on start-up or pursuant to activation of the appropriate control 703. Within this view, a user can view all of their own cards, send their cards, create new cards, or delete existing cards. When a calling card is edited within this interface, the corresponding copies held by other users are automatically updated at an appropriate time, such as when each other user comes online. The updated copies preferably automatically reside in the card libraries of the other users that have previously received the relevant card, within an interface such as that described with respect to FIG. 7B.

FIG. 7B shows an interface 709 for displaying and accessing the cards that the owner has received ("card library"). This interface 709 is typically accessed via selection of the appropriate control 705, but may also be presented by default. Within the interface 709, the user is presented with a potentially scrollable visual listing 711 of the cards 713, 715, 717, 719 that the user has received from other users. The front side of each card 713, 715, 717, 719 is preferably displayed in thumbnail view within the display 711 by default. A selectable control 721 may be provided to view the cards in full form rather than as thumbnails, at which point the rear side of each card 713, 715, 717, 719 is accessible via the flip control associated with each card. A further control 723 is usable to return to the thumbnail view, while a control 725 is usable to list the cards textually rather than graphically. Using the selectable controls 727, 729 respectively, a selected card in the library may be sent to another user or deleted.

FIG. 7C illustrates an interface 731 for displaying a user's own social network ("3°"). The interface of FIG. 7C is accessible from the previously described interfaces of FIGS. 7A and 7B via selection of the appropriate selectable control 707, or may be presented by default. The primary feature of the interface of FIG. 7C is the social network 733. The network 733 shows each user to whom the viewing user's calling card has been given, as well as their degree of separation from the viewing user. For example, user 735 received the viewing user's calling card from an intermediate user 737. The higher the degree of the recipient, the more steps that recipient is removed from the viewing user themselves.

A selectable control such as sliding scale 739 is usable to set the number of degrees that will be displayed within the interface 731. A key 741 can be used to indicate which user has which card of the viewing user. For example, the viewing user may have both a general card and a friend card. The key allows the user to determine, in conjunction with the illustrated network, which user has been given which card.

Preferably the network 733 conveys a sense of the social power of the illustrated users. For example, in the illustrated embodiment, the size of dot that a user is represented with shows the social power of the user. For example, a larger dot may connote a higher relative social power than a smaller dot. In an embodiment of the invention, the social network 733 can also be used to indicate common friends of the viewing user and a selected user. For example, by selecting a particular user in the network 733, the viewing user is shown, in an embodiment of the invention, a subnetwork of users that have both the viewing user's card and the selected user's card. The subnetwork may be differentiated by highlighting or otherwise. This helps the viewing user to determine common friendships and groups that may share common interests.

Figure 4:
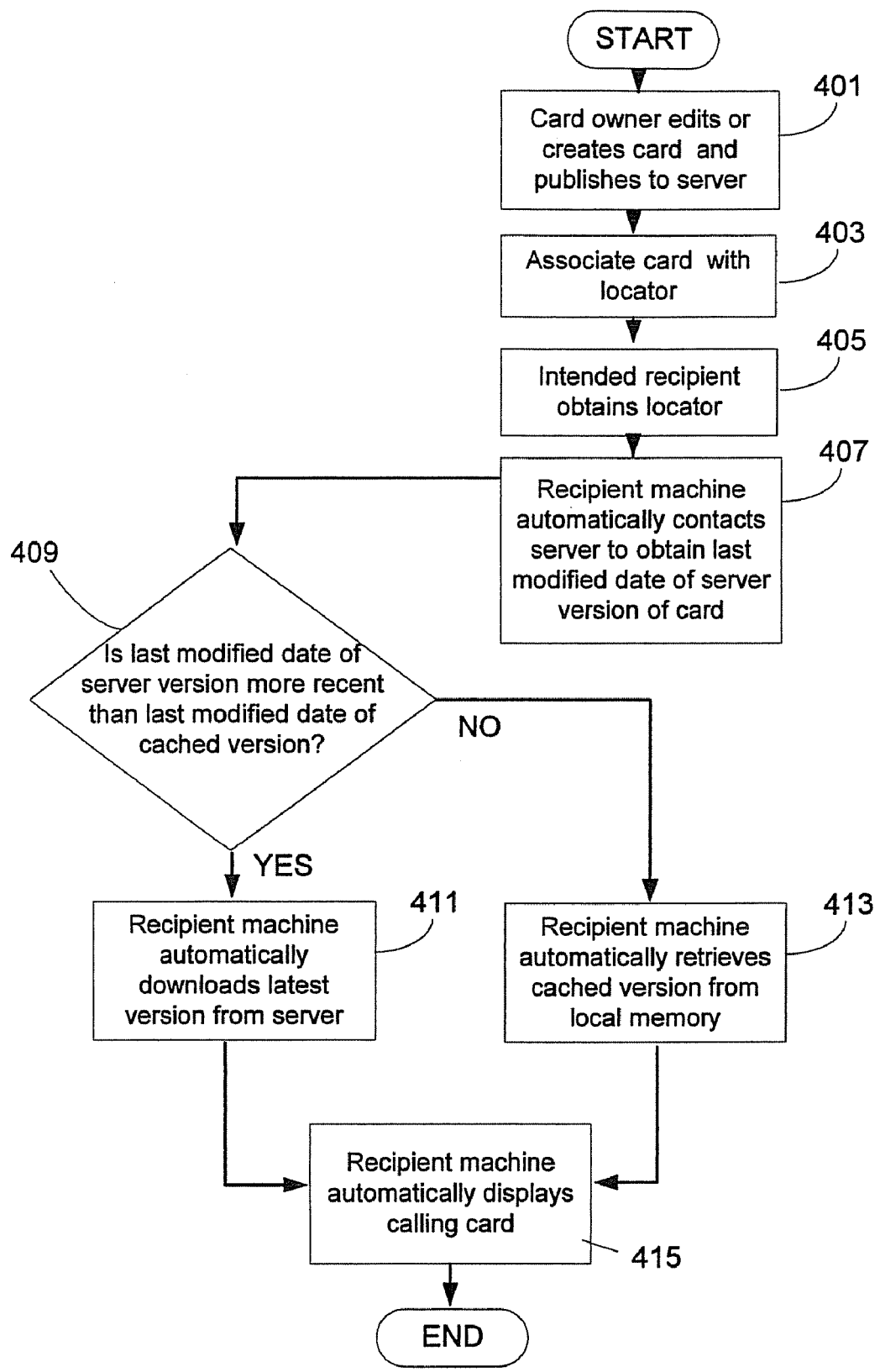
FIG. 4 is a flow chart illustrating a process for exchanging a calling card according to an embodiment of the present invention.
Figure 5A:
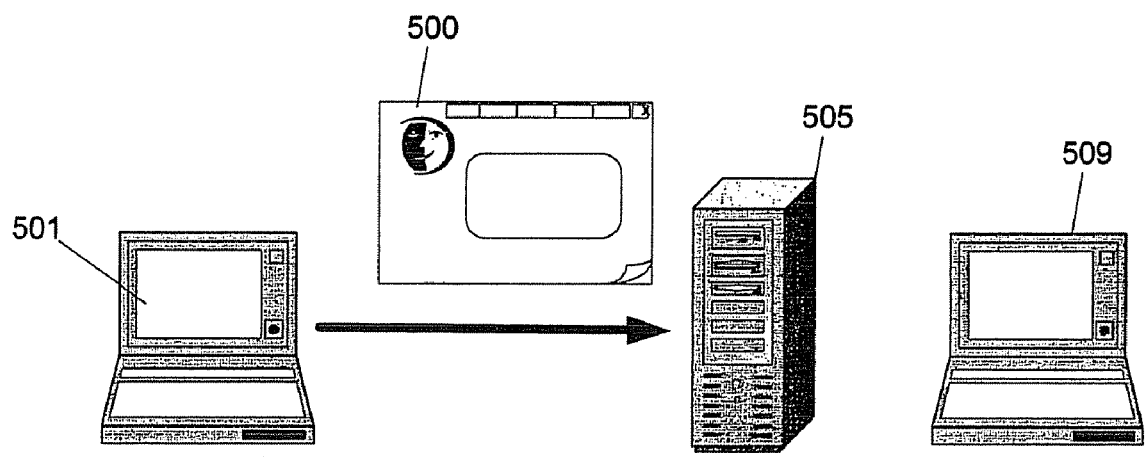
FIG. 5A is a schematic diagram showing calling card publication to a central server in an embodiment of the invention.
Figure 5B:
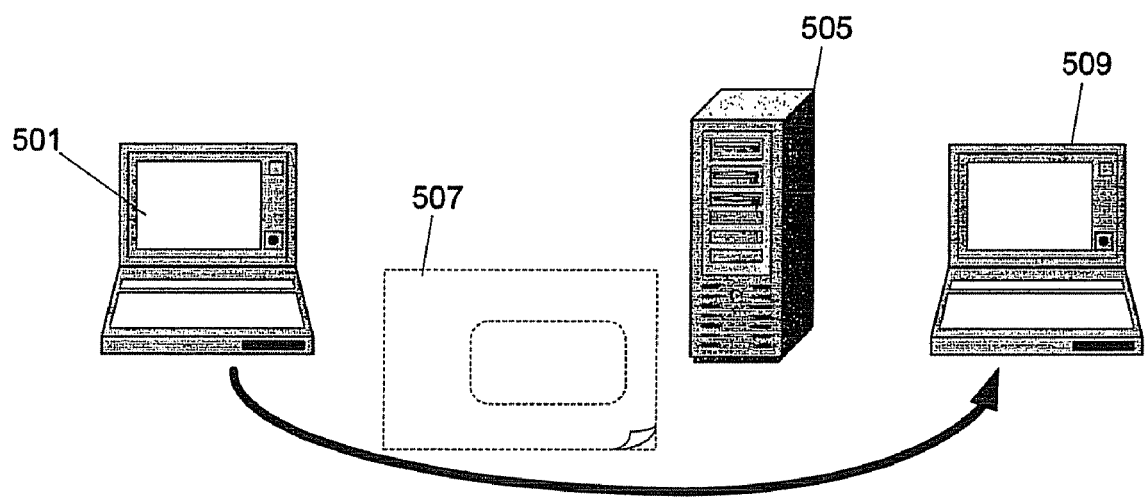
FIG. 5B is a schematic diagram showing the exchange of a calling card locator according to an embodiment of the invention.
Figure 5C:
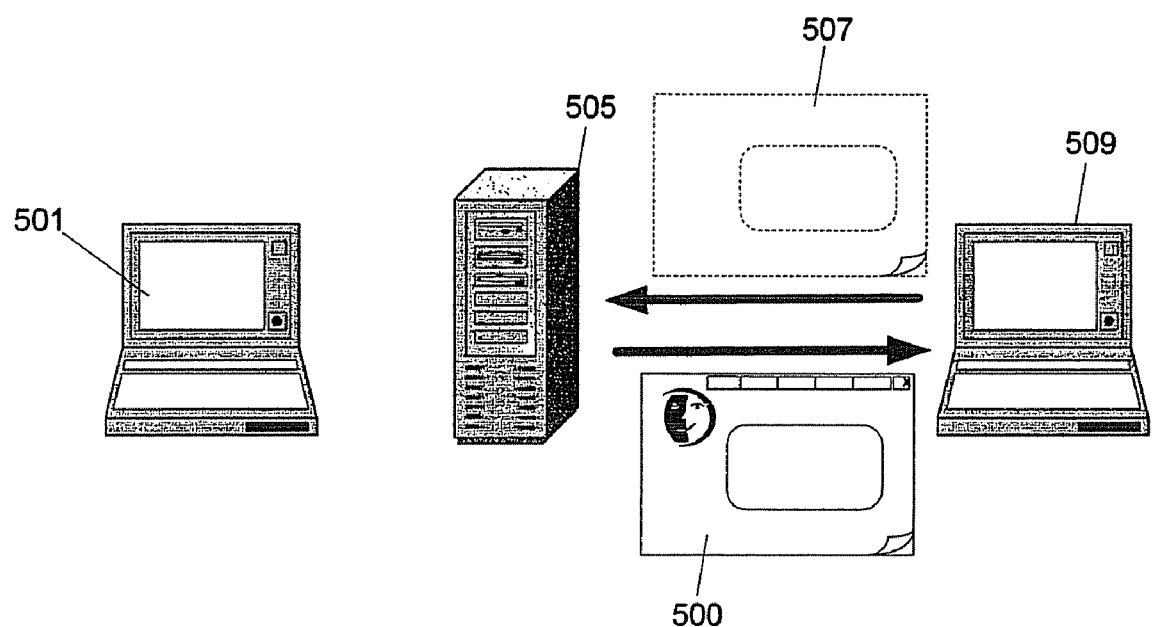
FIG. 5C is a schematic diagram showing retrieval of a calling from a central server using the calling card locator according to an embodiment of the invention.

The flow chart of FIG. 4 shows in greater detail the process by which a calling card may be created or edited and passed from one party to another. In conjunction with FIG. 4, the schematic network diagrams of FIGS. 5A-5C illustrate the communications entailed during transfer of the calling card as will be discussed in greater detail hereinafter. At step 401, the calling card owner finishes editing or creating the calling card 500 via an owner machine 501 and publishes the card 500, or its latest version, to a central server 505, such as is illustrated in FIG. 5A. At the central server 505, the calling card 500 is associated in step 403 with a locator 507. In an embodiment of the invention, the locator is derived by performing a one-way hash on the contact information of the owner as discussed above.

In step 405, an intended recipient receives the locator. In FIG. 5B, the locator is shown as being passed from the owner machine 501 to the recipient machine 509, although the locator could also be passed to the intended recipient by any other party who has obtained it. At step 407, the recipient machine 509 automatically contacts the server 505 to obtain the last modified date of the server version of the card 500, and at step 409 automatically compares the last modified date of the server version to the last modified date of a cached version, if any, of the card 500. The cached version will typically be stored in local, preferably nonvolatile, memory such as flash memory or disc memory.

If it is determined at step 409 that the last modified date of the server version of the card 500 is more recent than the last modified date of a cached version (or that there exists no cached version) then the process flows to step 411, whereat the recipient machine 509 automatically downloads the latest version of the card 500 from the server 505. This action is illustrated in FIG. 5C. Otherwise, the recipient machine 509 automatically retrieves the cached version of the card 500 from local memory at step 413. Both of steps 411 and 413 flow to step 415, at which point the recipient machine automatically displays the calling card 500. Note that the manner in which the calling card 500 is displayed is determined by the context in which the recipient machine opened the card, as discussed above. That is, the calling card may be displayed full-scale or as a thumbnail, and may be fully functional or may have certain options suppressed or disabled.

Since the scenario described by way of FIGS. 4 and 5A-C entails the viewing of the card by a party other than the owner, the editing functionality for the card is preferably not enabled in the resultant view. Furthermore, note that although the immediately foregoing example describes a situation wherein a calling card locator is passed to a recipient machine to enable that machine to automatically retrieve the calling card, a party having the card owner's contact information may instead derive the calling card locator in an embodiment of the invention.

Note that the embodiments described above relate to traditional mobile and non-mobile computing devices, such as PCs and PDAs, as well as devices such as cell phones that are not generally considered to be computing devices. The invention can similarly yield significant benefits when used on a device whose primary function is communication. For example, cell phone users may beam calling cards to one another and may keep the calling card (generally in reduced display size) as a visual indicator associated in an address book with the card owner. The calling card continues, in this capacity, to facilitate first party discovery as well as third party introduction.

It will be appreciated that a novel online introduction and contact system and method have been described for enabling online parties to express themselves in a format that is exchangeable and current, and that serves as a contact point for the commencement or continuation of online relationships and associations. The novel system and method facilitate meeting dynamics that are similar in many ways to physical world interpersonal dynamics. In view of the many possible embodiments to which the principles of this invention may be applied, it should be recognized that the embodiments described herein with respect to the drawing figures are meant to be illustrative only and should not be taken as limiting the scope of the invention. Those of skill in the art will recognize that the elements of the illustrated embodiments shown in software may be implemented in hardware and vice versa or that the illustrated embodiments can be modified in arrangement and detail without departing from the spirit of the invention. For example, although the examples herein describe one calling card being associated with one owner, note that a calling card owner may have multiple cards so as to distribute different cards to different people. In this situation, the locator would also contain an identification of which particular one of the owner's calling cards is being retrieved. Therefore, the invention as described herein contemplates all such embodiments as may come within the scope of the following claims and equivalents thereof.

What is claimed is:

1. A system comprising components embodied on a computer-readable storage medium that when executed on a processor facilitate generating a graphical user interface for a virtual calling card, comprising:
  a first display component that displays a front side of the virtual calling card and a plurality of active controls therein, wherein the plurality of active controls comprises a pass control and at least one of an add control, a chat button, an edit control, and a flip control, and wherein selection of the pass control automatically updates the calling card; and
  a second display component that displays a social network of a user represented by the virtual calling card on a reverse side of the virtual calling card, wherein the social network comprises a plurality of users who have received the virtual calling card and a degree of separation between the users in the network, the degree of separation is based at least in part on the path by which the virtual calling card was passed to the users in the network.

2. The system of claim 1, the social network is organized according to known preferences of a user.

3. The system claim 2, the flip control initiates the second display component to display the reverse side of the virtual calling card.

4. The system of claim 1, the first display component further employed to display at least one user-defined attribute associated with the user on the front side of the virtual calling card.

5. The system of claim 4, the at least one user-defined attribute comprises at least one of the user's character, the user's name, an indication of the user's most recent mood, a background image, a text area, and affiliation symbols.

6. The system of claim 5, the text area comprises at least one of images, video, and formatted text.

7. The system of claim 6, the formatted text formatted using Hyper Text Markup Language (HTML) tags.

8. The system of claim 1, the first display component further comprises a user preference component that allows the user to modify user-defined attributes.

9. The system of claim 1, the second display component further comprises a social network component that retrieves information associated with the social network of the user from at least one computer system.

10. A computer implemented method for generating a graphical user interface for a virtual calling card, comprising:
  providing a plurality of active controls on a front side of the virtual calling card, wherein the plurality of active controls comprises a pass control and at least one of an add control, a chat button, an edit control, and a flip control, and wherein selection of the pass control automatically updates the calling card;
  displaying at least one user-defined attribute on the front side of the virtual calling card; and
  displaying social network information on a reverse side of the virtual calling card, wherein the social network information comprises a plurality of recipients of the virtual calling card and a degree of separation between the recipients, the degree of separation is based at least in part on the recipients in the path by which the virtual calling card was passed to the recipients in the network.

11. The method of claim 10, further comprising modifying at least one user-definable attribute according to inputs from a user.

12. The method of claim 10, further comprising updating a stored version of the virtual calling card.

13. The method of claim 10, further comprising suppressing at least one user-definable attribute associated with a user.

14. The method of claim 10, displaying social network information on a reverse side of the virtual calling card further comprises organizing the social network according to known preferences of a user.

15. The method of claim 10, displaying social network information further comprises retrieving a list of contacts from at least one computer system.

16. The method of claim 15, further comprising compiling the list of contacts from a central data store reachable via a computer network.

17. The method of claim 15, further comprising obtaining the list of contacts from an online application.

18. The method of claim 10, displaying social network information further comprises presenting statistical information associated with the social network of the user.

19. The method of claim 10, further comprising caching the virtual calling card as an XML entity.

20. A computer-readable medium having thereon computer-readable instructions for generating a graphical library interface for viewing and manipulating virtual calling cards comprising, a library interface for viewing and manipulating at least one virtual calling card, the at least one virtual calling card displays a plurality of active controls on the front side thereon, wherein the plurality of active controls comprises a pass control and at least one of an add control, a chat button, an edit control, and a flip control, and wherein selection of the pass control automatically updates the calling card; and a social network interface for displaying a social network on the reverse side of the at least one virtual calling card indicating a plurality of users who have received a virtual calling card and a degree of separation between the users in the network, the degree of separation is based at least in part on the users in the path through the network between two users.

\* \* \* \* \*